United States Patent [19]
Ii et al.

[11] Patent Number: 5,456,553
[45] Date of Patent: Oct. 10, 1995

[54] SOIL OR GROUND REINFORCEMENT TREATMENT METHOD

[75] Inventors: Tsukio Ii; Akira Ii; Kiyoshi Ii; Takayoshi Mizoguchi, all of Fukuokaken, Japan

[73] Assignee: Fe Lime Industry Corporation, Fukuokaken, Japan

[21] Appl. No.: 57,953

[22] Filed: Apr. 28, 1993

[30] Foreign Application Priority Data

Dec. 15, 1992 [JP] Japan ................................. 4-353684

[51] Int. Cl.⁶ ........................................................ E02D 3/12
[52] U.S. Cl. ........................... 405/263; 106/900; 405/258
[58] Field of Search ........................................ 405/263, 264, 405/258; 106/900; 404/76; 166/293, 294

[56] References Cited

U.S. PATENT DOCUMENTS

| | | | |
|---|---|---|---|
| 3,876,439 | 4/1975 | Schneider | 106/900 X |
| 4,266,980 | 5/1981 | Chudo et al. | 106/900 X |
| 4,292,085 | 9/1981 | Piccolo et al. | 106/900 X |
| 4,306,910 | 12/1981 | Miyoshi et al. | 106/900 X |
| 4,380,408 | 4/1983 | Loken et al. | 405/263 |
| 4,655,839 | 4/1987 | Chao et al. | 106/900 X |
| 4,946,311 | 8/1990 | Rosar et al. | 405/263 X |
| 5,118,219 | 6/1992 | Walker | 405/263 X |

FOREIGN PATENT DOCUMENTS

| | | |
|---|---|---|
| 52-7256 | 3/1977 | Japan . |
| 54-25738 | 8/1979 | Japan . |
| 63-134709 | 6/1988 | Japan . |

*Primary Examiner*—Dennis L. Taylor
*Attorney, Agent, or Firm*—Lonacre & White

[57] ABSTRACT

A soil or ground reinforcing material consisting of Al—Fe oxides mixture the main contents of which are iron oxide made from fine iron oxide powder byproduced in steel production and Aluminum oxide made from red mud byproduced in Aluminum smeltering and lime added therein is mixed into a soil containing crushed stones, natural soil, etc., and further Titanium oxide is mixed into the above soil or ground reinforcing material to make Al—Fe—Ti oxides mixture in which lime is added and mix this material into a soil or ground containing crushed stones, natural soil, etc. to enhance the strength and viscoelasticity thereof. The content of the Titanium oxide in the soil or ground reinforcing material is within the range of 0.5–2.0% by weight.

5 Claims, 11 Drawing Sheets

Chemical Reaction Formula

SILICA POWDER (CONTAINS Al-Fe-Ca BY 7%)   (AGE: 0 DAY)

X 3,000

SILICA POWDER (CONTAINS Al-Fe-Ca BY 7%)   (AGE: 4 DAYS)

X 3,000

SILICA POWDER (CONTAINS Al-Fe-Ca BY 7%)   (AGE: 28 DAYS)

× 3,000

SILICA POWDER (CONTAINS Al-Fe-Ca BY 7%)   (AGE: 60 DAYS)

× 3,000

SILICA POWDER (CONTAINS SLAKED LIME BY 7%) (AGE: 0 DAY)

X 3,000

SILICA POWDER (CONTAINS SLAKED LIME BY 7%) (AGE: 4 DAYS)

X 3,000

Single Axial Compression Test Result of Treated Soil Using Decomposed Granite
(Sample age to Single axial strength)

Single Axial Test Result of Treated Soil Using Decomposed Granite
(Sample age to Strain at Maximum stress)

Single Axial Compression Test Result of Treated Soil Using Sirsu
(Sample age to Single axial strength)

Single Axial Test Result of Treated Soil Using Sirsu
(Sample age to Strain at maximum stress)

CBR Test Result of Treated Soil Using Silica Sand

SOIL OR GROUND REINFORCEMENT TREATMENT METHOD

BACKGROUND OF THE INVENTION

1. Field of the Invention

This invention relates to a soil or ground reinforcement treatment method that can enhance the strength and viscoelasticity of a soil or ground by mixing an Al—Fe oxides mixture made from a fine iron oxide powder byproduced in steel production and a red mud byproduced in aluminum smeltering with lime or further mixing a titanium oxide added Al—Fe—Ti oxides mixture with lime to produce a soil or ground reinforcing material and by adding the soil or ground reinforcing material into the soil or ground containing crushed stones, natural soil. etc.

2. Description of the Prior Art:

The total length of paved roads would be approximately 770,000 km or about 70% of the total roads of 1,110,000 km and the roads paved with asphalt concrete (a pavement to make the surface with asphalt concrete) would be above 95% of the paved roads in Japan. The shear strength of the asphalt concrete can be maintained by keeping the air voids of the mixture at a specified percentage. (3–7%) However, the viscosity resistance of asphalt is greatly dependent on the temperature and as the resistance falls during the hot summer, the asphalt concrete would be tightened by heavy traffic loads to decrease the air voids percentage. When the air voids percentage falls below 2% the shear strength would sharply drop and a fluid rutting occurs to lose the pavement function. However, should the air voids percentage of the asphalt concrete be larger than the specified percentage, the asphalt in the mixtures would react with oxygen and be hardened to lose the viscosity and a crack destruction would occur due to a lack of flexibility during the cold winter.

Japan is a long and slender chain of islands extending from the north to the south and because of its topographical features of sharp difference in the altitudes, the climatic conditions are such rigorous one to the asphalt pavement as heavy snow in the northern Japan and in the mountains during winter and the rise in the temperature up to 60° C. at the surface of the asphalt concrete with 30° C. of ambient temperature in summer. Further the traffic conditions are such that the registered heavy vehicles in Japan are about 10 times more than those registered in a major country in Europe and a larger destructive action is being given to the pavement in Japan. For this reason the paved roads are designed to be durable for ten years in Japan.

Nevertheless, the heavy traffic roads are apt to cause fluid ruttings due to the insufficient strength in hot summer and relatively less heavy traffic roads lose the pavement function due to a crack destruction caused by the insufficient flexibility through an aging of the asphalt. As a result, such heavy traffic roads in general area are obliged to be repaired in 3–4 years after the service was started, since the fluid rutting reaches the serviceable limit. Such counter-measures for the fluid rutting as an improvement of the thermal sensitivity of the asphalt are being taken but there were other problems like a crack that occurred frequently and sufficient measures have not yet been established. The method of adding lime has been used to reinforce a soil or ground for many years and the reaction mechanism is (1) to make a lump of the soil particles through an ion-exchange reaction on the particle surface and (2) to give a hardening action through the formation of calcium carbonate. However, according to recent research, (3) noncrystalline substances such as silica ($SiO_2$) or alumina ($Al_2O_3$) which forms the clay or colloids in the soil or ground would hydrate with lime in the soil or ground to produce calcium silicate hydrate or calcium aluminate hydrate. These materials in a single form or in a composit form can serve as a binder to increase the strength and to maintain the durability. In general this reaction is called Lime-Pozzolan Reaction and the success of a soil or ground reinforcement treatment with lime is considered to be dependent on the Lime-Pozzolan Reaction.

In case a soil or ground reinforcing material made from natural soil added with lime or cement is used as a pavement construction material, the strength and the viscoelasticity are in the relationship of antinomy each other. For instance, it was impossible to obtain the properties having above 1.0% strain at the maximum stress and above 10 $Kg/cm^2$ of the single axis compression strength simultaneously.

Now such properties have become obtainable by using a soil or ground reinforcing material made from a Fe oxides mixture added with lime and the purpose intended was achieved tentatively. The soil or ground reinforcing material which is a blend of a fine Fe oxides powder, quick lime, slaked lime and lime stone powder shall be called "Fe lime" in this specification hereafter.

The inventors of this application have made some inventions based on this Fe lime with acceptable achievements so far. For instance, the inventions are on a paved road construction method by making the soft base of subgrade intermediate course with a mixture of natural soil, converter slug, a fine iron oxide powder and slaked lime (please refer to Japan Patent Publication No.52-7256), and on a simplified road pavement construction method by providing a reinforced soil or ground material course as an intermediate course in between the base material course and the subgrade to utilize the chemical reaction of natural soil added with a fine iron oxide powder and slaked lime (please refer to Japan Patent Publication No. 54-25738) and further on a prevention method of settlement due to consolidation by reinforcing the soft base by making the surface ground with a reinforced soil or ground material made from natural soil added with a fine iron oxide powder and slaked lime and by making the thickness of the reinforced soil or ground material course the one that can secure an elastic coefficient below the critical deflection against the load of constructed structure (Japan Patent Application Laid Open No.63-134709). The soil or ground reinforcement treatment using the Fe lime is able to produce a fairly good quality material because in case the soil in which the Fe lime is to be mixed (the soil used) is a decomposed granite which is a remained soil of weathered granite rock, it contains much reactive noncrystalline materials (such as $SiO_2$, $Al_2O_3$ and $Fe_2O_3$). However, if the soil used is a high crystalline material consisting of $SiO_2$ which is represented by silica sand such as a hill sand, riverbed earth and sand and gravel soil containing less clay or unweathered pyroclastic flow deposit the main mineral of which is volcanic glass and most of the contents are sand and silt called sirsu, there is such a problem that the soil contains little noncrystalline material and therefore the strength intended cannot be obtained.

The object of this invention is to present a soil or ground reinforcement treatment that can give the strength and viscoelasticity intended to each course in the pavement by making the soil or ground reinforcing material have a specifc composition without limiting to a specific soil to be used. For instance, in case the soil used is a decomposed granite, the strength can be improved greatly by using the soil or ground reinforcement treatment of this invention without impairing the deflection property of the conventional reinforced soil or ground material with Fe lime. Hence an application of this invention to the base upper course of a heavy traffic road has become possible and the deflection of a pavement can be substantially reduced and such a structural destruction of the pavement and a fluid rutting can be prevented by tile buffer action of the viscoelasticity as well.

Scoria bed widely distributed in southern Kyushu of Japan is considered to be a coagulated deposit of volcanic effusives and was unacceptable to the soil of farm land and removed from major farm lands in the area. According to the information collected during the period of the removal project was planned, (1) the average of water content was 37% in the range of 28–54%, (2) the average bending tension strength of a cut sample (4×4×16 cm) was 2.3 $kgf/cm^2$ in the range of 1.4–4.3 $kgf/cm^2$ with a Michael Test Machine. (3) According to a removal test by a machine the most efficient method was to drop a 2.7 tons rake having 8 blades with 50 cm spacing in 3 m wide from 1 m high on the scoria bed several times to crack the scoria bed and advance a bulldozer while pulling up the rake to take the scoria plates and turn back.

This method is identical to the removal of relatively thick asphalt concrete plates in the paved road repair works and the scoria bed is not only hard but also viscoelastic similar to an asphalt mixture bed and is also very similar to the asphalt concrete in the particle size. Hence, it is considered from a mechanical viewpoint that the friction resistance is given by an aggregate and the viscoelastic property by a mineral having similar viscous or cohesive resistance to the asphalt.

The present invention was first planned with an assumption that if such a mineral having similar viscous resistance to the asphalt binder should be produced artificially, an ideal soil or ground reinforcing material could be obtained.

SUMMARY OF THE INVENTION

This invention relates to a soil or ground reinforcement treatment by mixing a soil or ground reinforcing material of aluminum oxide and iron oxide rich Al—Fe oxides mixture added with lime into a soil or ground containing crushed stones, natural soil, etc. and preferably the soil or ground reinforcing material is an Al—Fe—Ti oxides mixture containing titanium oxide in addition to the main contents of aluminum oxide and iron oxide and added with lime, and further the content of Al—Fe—Ti oxides mixture in the soil or ground reinforcing material is such that the aluminum oxide content is in the range of 5–15% by weight, the iron oxide content in the range of 15–35% by weight and the titanium oxide content in the range of 0.5–2.0% by weight.

BRIEF DESCRIPTION OF THE DRAWINGS (FIG. 1)

This Figure is a formula describing the mechanism of the chemical reaction when the soil or ground reinforcing material is added to soil with regard to the embodiments of this invention.

(FIG. 2)

This Figure is a microscopic photograph indicating a cut surface of a 0 day old sample of the soil:or ground reinforcing material added to silica powder with regard to the embodiments of this invention.

(FIG. 3)

This Figure is a microscopic photograph of a cut surface of a 4 days old sample of the soil or ground reinforcing material added to silica powder with regard to the embodiments of this invention.

(FIG. 4)

This Figure is a microscopic photograph of a cut surface of a 28 days old sample of the soil or ground reinforcing material added to silica powder with regard to the embodiments of this invention.

(FIG. 5)

This Figure is a microscopic photograph of a cut surface of a 60 days old sample of the soil or ground reinforcing material added to silica powder with regard to the embodiments of this invention.

(FIG. 6)

This Figure is a microscopic photograph of a cut surface of a 0 day old sample of conventional slaked lime added to silica powder.

(FIG. 7)

This Figure is a microscopic photograph of a cut surface of a 4 days old sample of conventional slaked lime added to silica powder.

(FIG. 8)

This Figure is a graph showing CBR Test Result of the soil or ground reinforcement treated soil using the decomposed granite added with the soil or ground reinforcing material with regard to the embodiments of this invention.

(FIG. 9)

This Figure is a graph showing Single Axial Compression Test Result indicating the relationship between the Single Axial Strength and the soil or ground reinforcement treated soil using the decomposed granite added with the soil or ground reinforcing material with regard to the embodiments of this invention.

(FIG. 10)

This Figure is a graph showing Strain Test Result indicating the relationship between the strain at the maximum stress and the age of the soil or ground reinforcement treated soil using the decomposed granite added with the soil or ground reinforcing material with regard to the embodiments of this invention.

(FIG. 11)

This Figure is a graph showing CBR Test Result of soil or ground reinforcement treated soil using sirsu added with the soil or ground reinforcing material with regard to the embodiments of this invention.

(FIG. 12)

This Figure is a graph showing Single Axial Compression Test Result indicating the relationship between the single axial strength and the age of the soil or ground reinforcement treated soil using the sirsu added with the soil or ground reinforcing material with regard to the embodiments of this invention.

(FIG. 13)

This Figure is a graph showing Strain Test Result indicating the relationship between the strain at the maximum stress and the age of the soil or ground reinforcement treated soil using sirsu added with the soil or ground reinforcing material with regard to the embodiments of this invention.

(FIG. 14)

This Figure is a graph showing CBR Test Result of the soil or ground reinforcement treated soil using silica sand added with the soil or ground reinforcing material with regard to the embodiments of this invention.

DESCRIPTION OF THE PREFERRED EMBODIMENTS

The embodiments of this invention are described in detail as follows:
1) Manufacture of the soil or ground reinforcing material
The raw material, Al—Fe oxides mixture (red mud) (refer to Table 2) is byproduced with about 30% water content. The wet red mud was dried by mixing with a suitable amount (equivalent ratio to a dried weight of the raw material) of quick lime (CaO) and/or slaked lime ($Ca(OH)_2$) at a specified mixing rate and obtained a soil or ground reinforcing material (Al—Fe—Ca soil or ground reinforcing material) having a composition as shown in Table 3.

The quick lime and slaked lime were products in the market with the chemical compositions as indicated in Tables 4 and 5.

Figure 9:
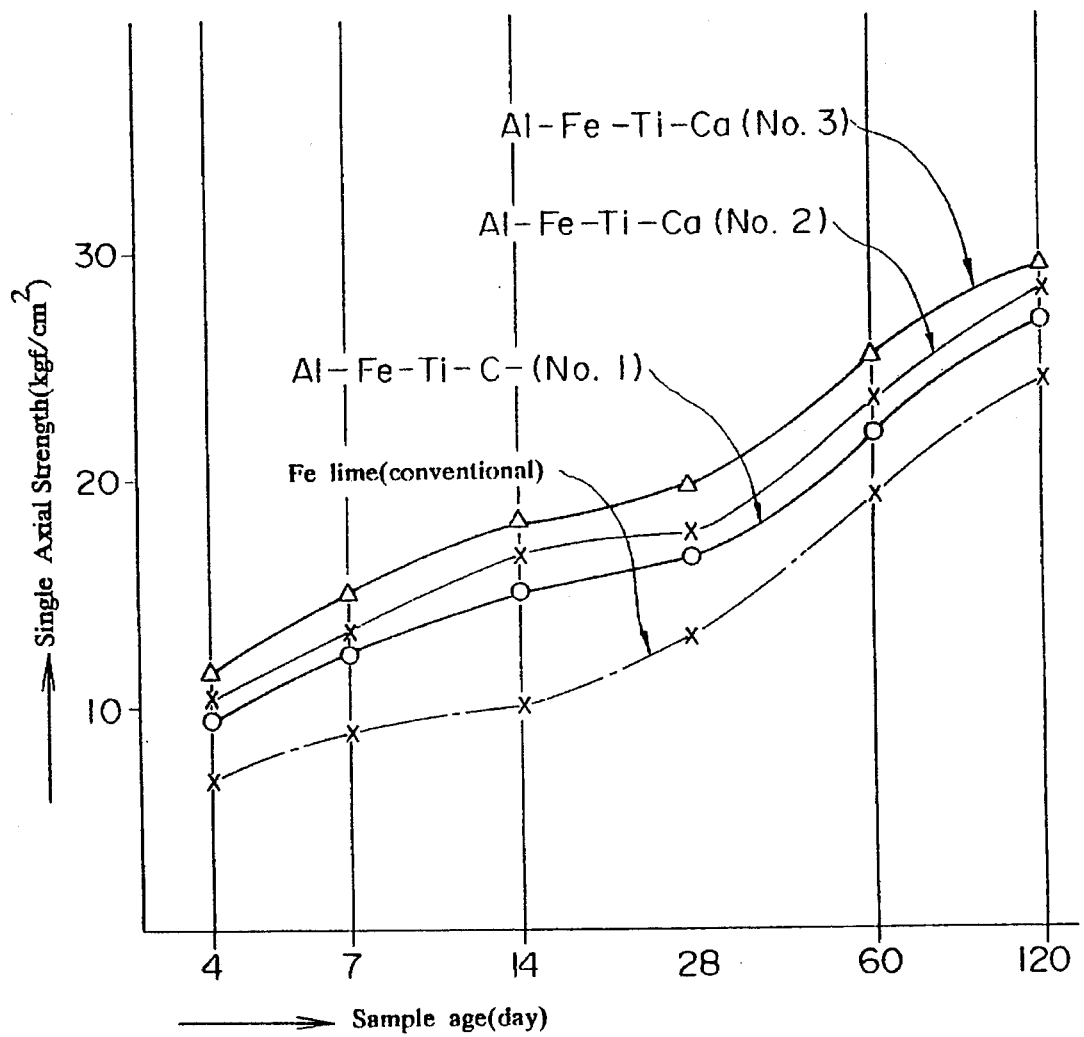
Figure 10:
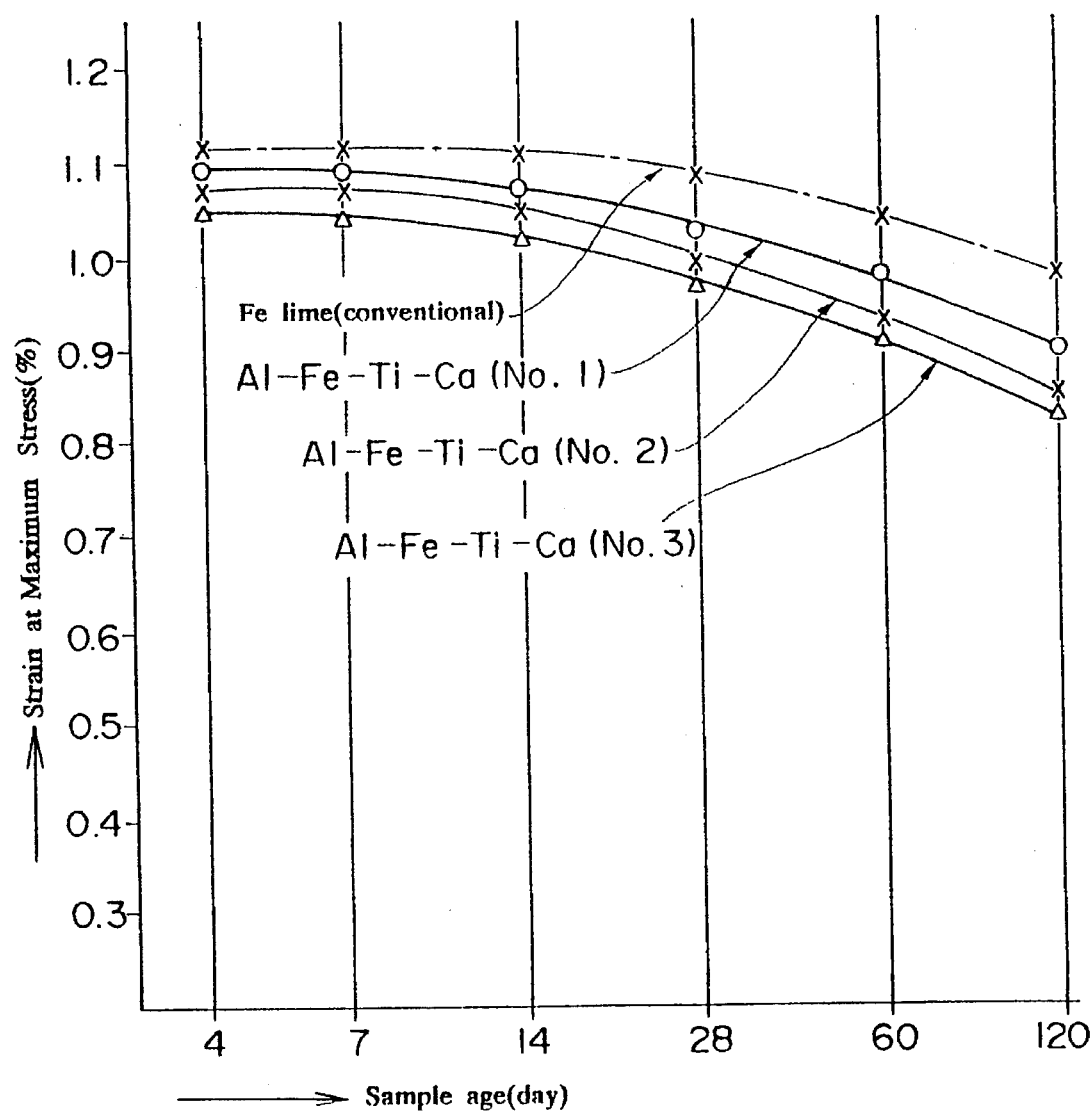

For comparison the compositions of conventional Fe lime are indicated in Tables 8, 9, 12, 13 and 15.
2) Soil or ground reinforcing treatment
2-1) Strength test of soil using decomposed granite The decomposed granite is a remained deposit of weathered granite rock and extensively distributed in the western Japan. The engineering properties of the decomposed granite is such that some are remarkably converted to clay depending on the weathered condition but generally it is a sandy soil 5–10% portion of which contains above 2 mm gravel and below 0.005 mm clay. The soil used was collected from a Soil Depot of Saga Soil Industry Co. Ltd., Yamatomachi, Saga Prefecture, Japan and the physical properties are shown in Table 6 and the chemical properties in Table 7. The soil or ground reinforcing material indicated in Table 3 was mixed with soil at a mixing rate of 93% soil and 7% material (dry weight composition) and prepared a sample of CBR 1 layer 20 times 5 layers by a stick-hardening in accordance with CBR Test Method of JIS A1211. The work of the stick-hardening was Ec=9.2 cm.kgf $cm^2$ by both CBR Test-and Single Axial Test and the water content of the stick-hardening was made to be the optimum content (13.3%) by the stick-hardening test of the soil used. The ageing method of the sample was non-water immersion immediately after the stick-hardening but the samples older than 4 days were immersed in water continuously (23° C.) immediately after the stick-hardening until the penetration test with regard to the CBR Test, and after the samples were sealed with film the samples were aged at a constant temperature (23° C.) until the one day before the loading test and the samples were completely saturated for 30 minutes with vacuum water then aged by water immersion (24 hours) with regard to the Single Axial Compression Test. The water immersion CBR Test Results are indicated in Tables 8 and 9, and the Single Axial Compression Test Results (the test was as per Standard of Soil Quality Engineering Society "JSF, T511-1990") in Table 9 and FIG. 9, and the Strain Test Result in FIG. 10 respectively.

As the test results clearly indicate, with regard to the relation between the sample age and the water immersion CBR(%) mid the relation between the sample age and the single axial strength ($kgf/cm^2$) a greater increase in the strength can be seen with the Al—Fe—Ca soil or ground reinforcement treated soil as compared with the conventional Fe lime soil or ground reinforcement treated soil and higher Al contents have greater CBR strength at any sample ages.

Figure 11:
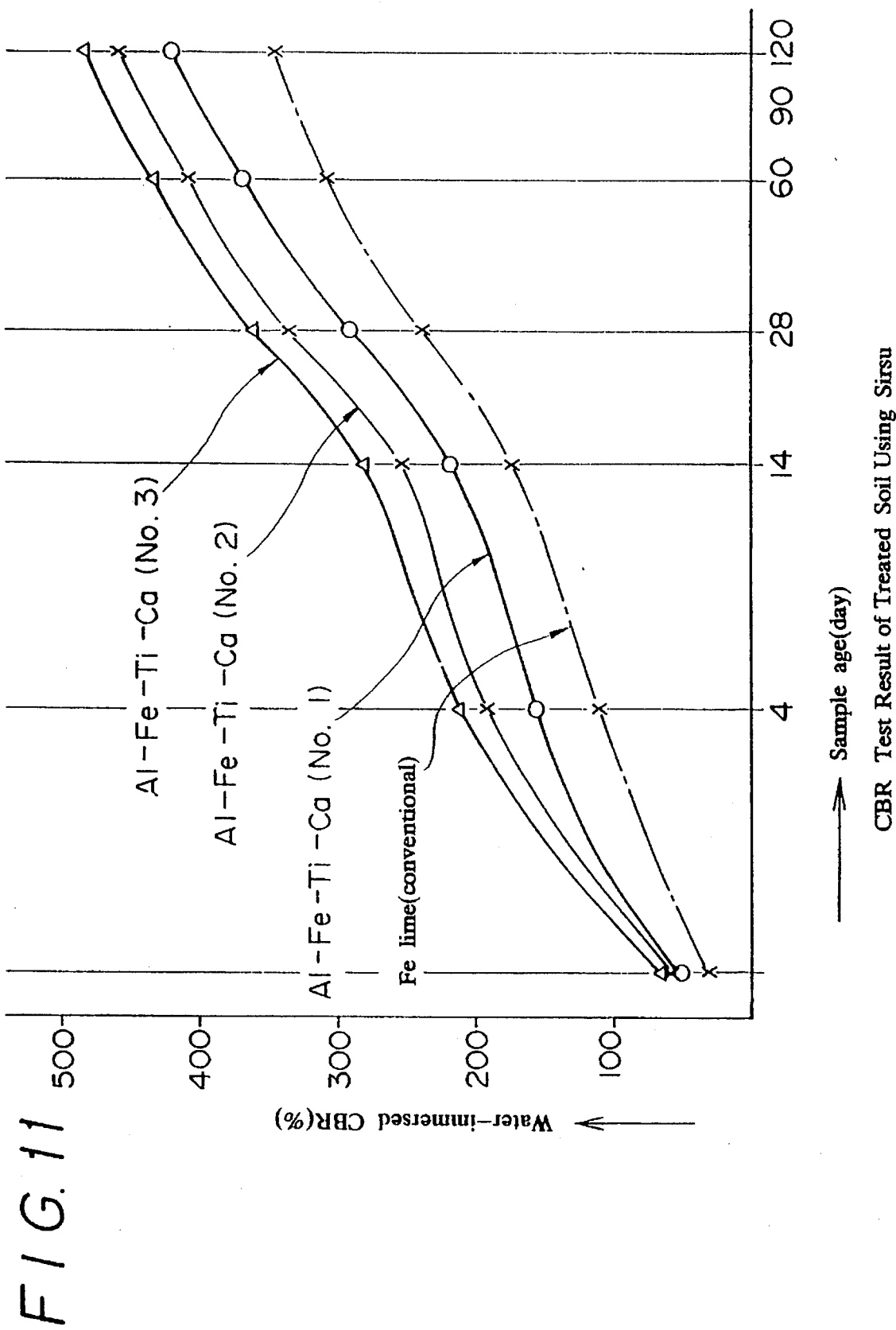
Figure 12:
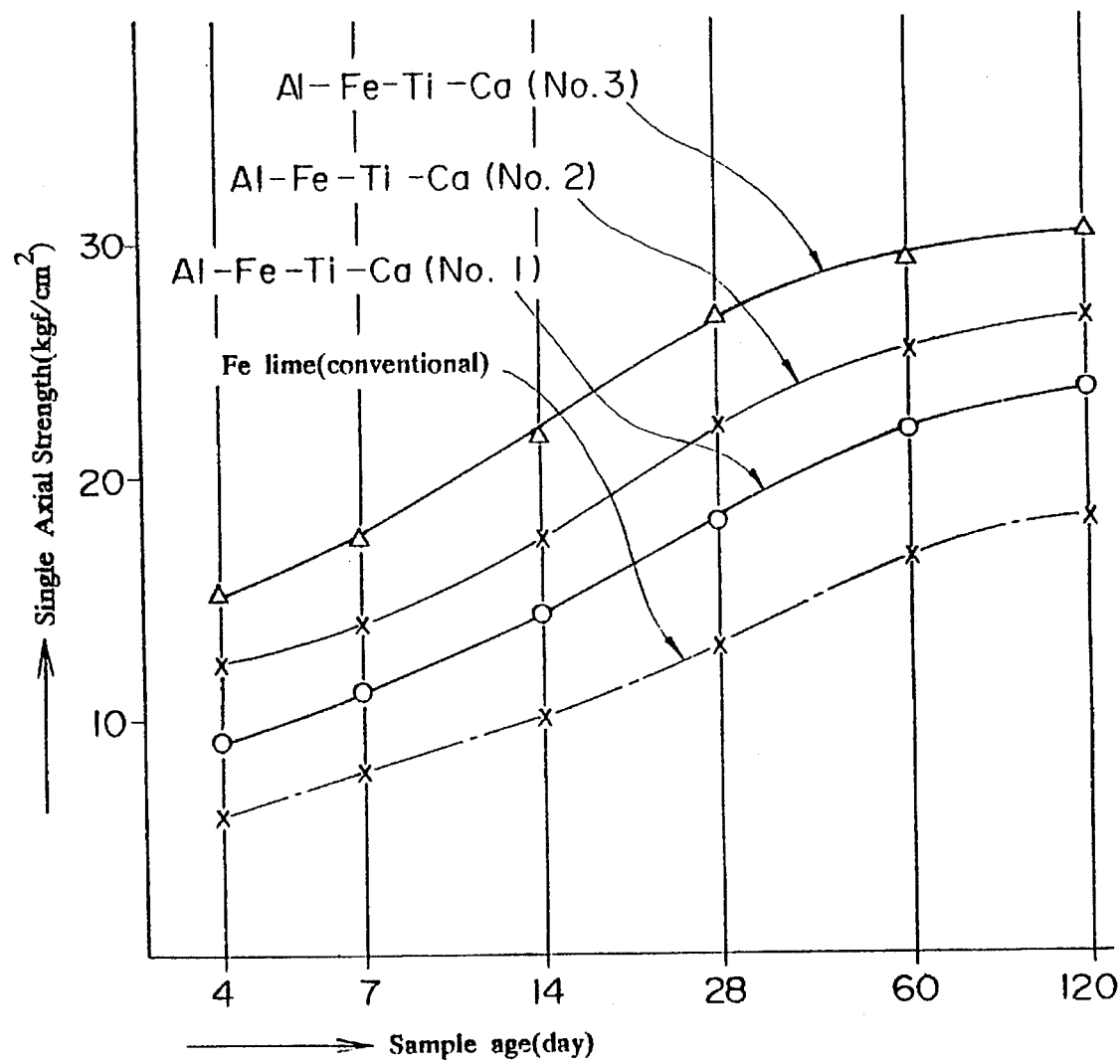
Figure 13:
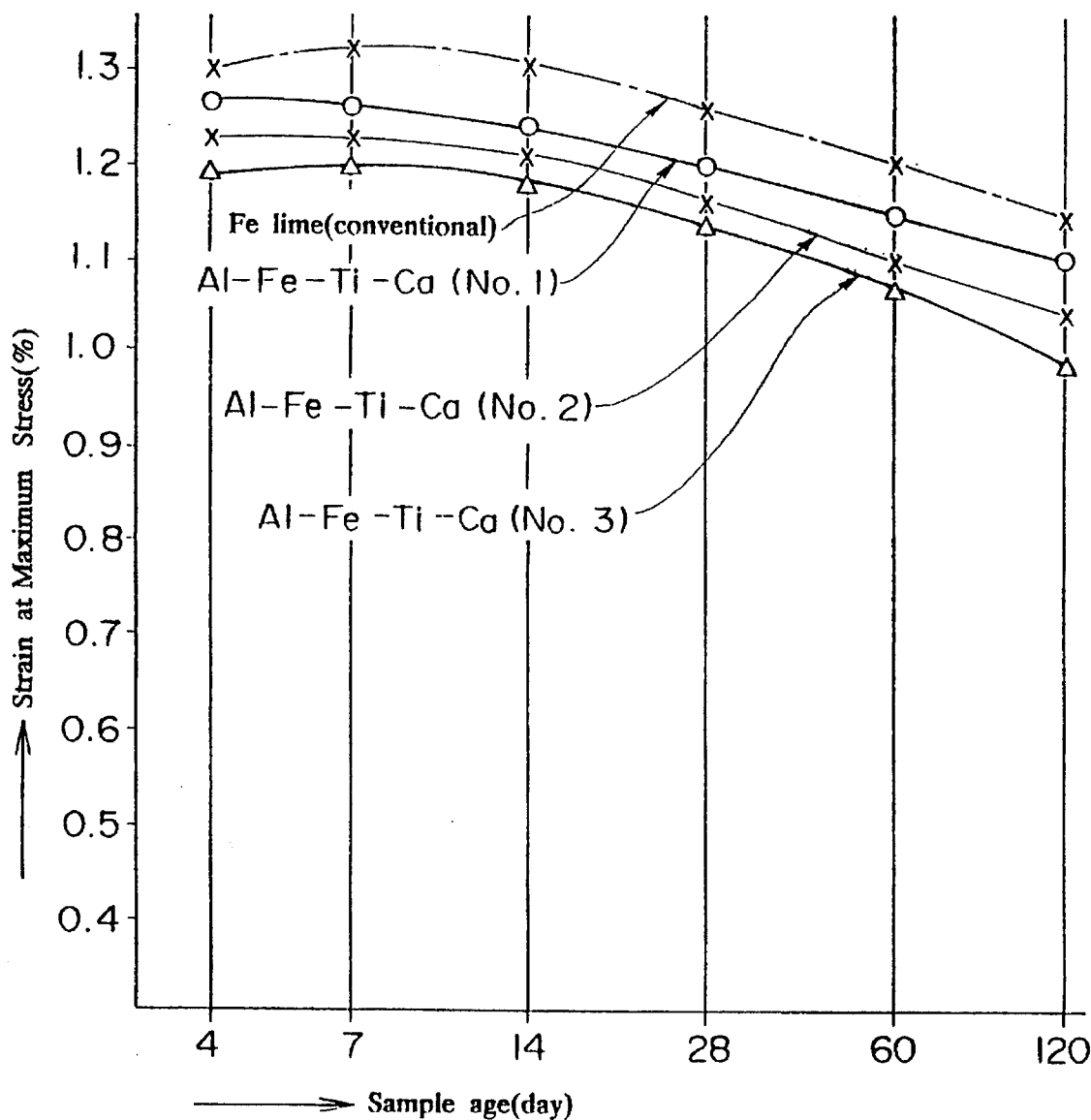

Further for instance, while the single axial strength (qu 28) of 28 days old samples in the former case (the present embodiments) is in 16-20, the strength is about 11 in the latter case (the conventional) and the strain at the maximum stress in the present embodiments was more than 1.0% that is by no means inferior to the value in the latter case.
2-2) Strength test with the soil of sirsu The sirsu is a deposit of volcanic effluent extensively distributed in southern kyushu of Japan and most of the composite particles are of volcanic glass and pumice. Hence the specific gravity of the particle (2.30–2.50 ) is lower than that of the general soil and is fragile to friction and breakable. Its major contents are sand and silt with a little contents of above 2 mm gravel fraction and 0.005 mm clay. The soil used was collected at a soil depot in Kagoshima City and the specific gravity of the soil particles and the particle size distribution are shown in Table 10 and the chemical composition in Table 11. The soil or ground reinforcing material indicated in Table 3 was mixed with this soil at 7% and 93% mixing rate (dried weight basis) and a sample was prepared by CBR 1 Layer 20 Times 5 Layers stick-hardening in accordance with JIS A 1211 CBR Test Method. The stick-hardening work was $E_c$=9.2 $cm.kgf/cm^2$ for both CBR Test and Single Axial Compression Test and the water content of the stick-hardening was made to be the optimum content by the stick-hardening test of the soil used. The ageing method of tile samples was made identical to the method adopted in the case of the soil using the decomposed granite. The water immersion CBR Test Results are shown in Table 12 and FIG. 11, and the Single Axial Compression Test Results are in Table 13 and FIG. 12 and the Strain Test Results are in FIG. 13.

Figure 14:
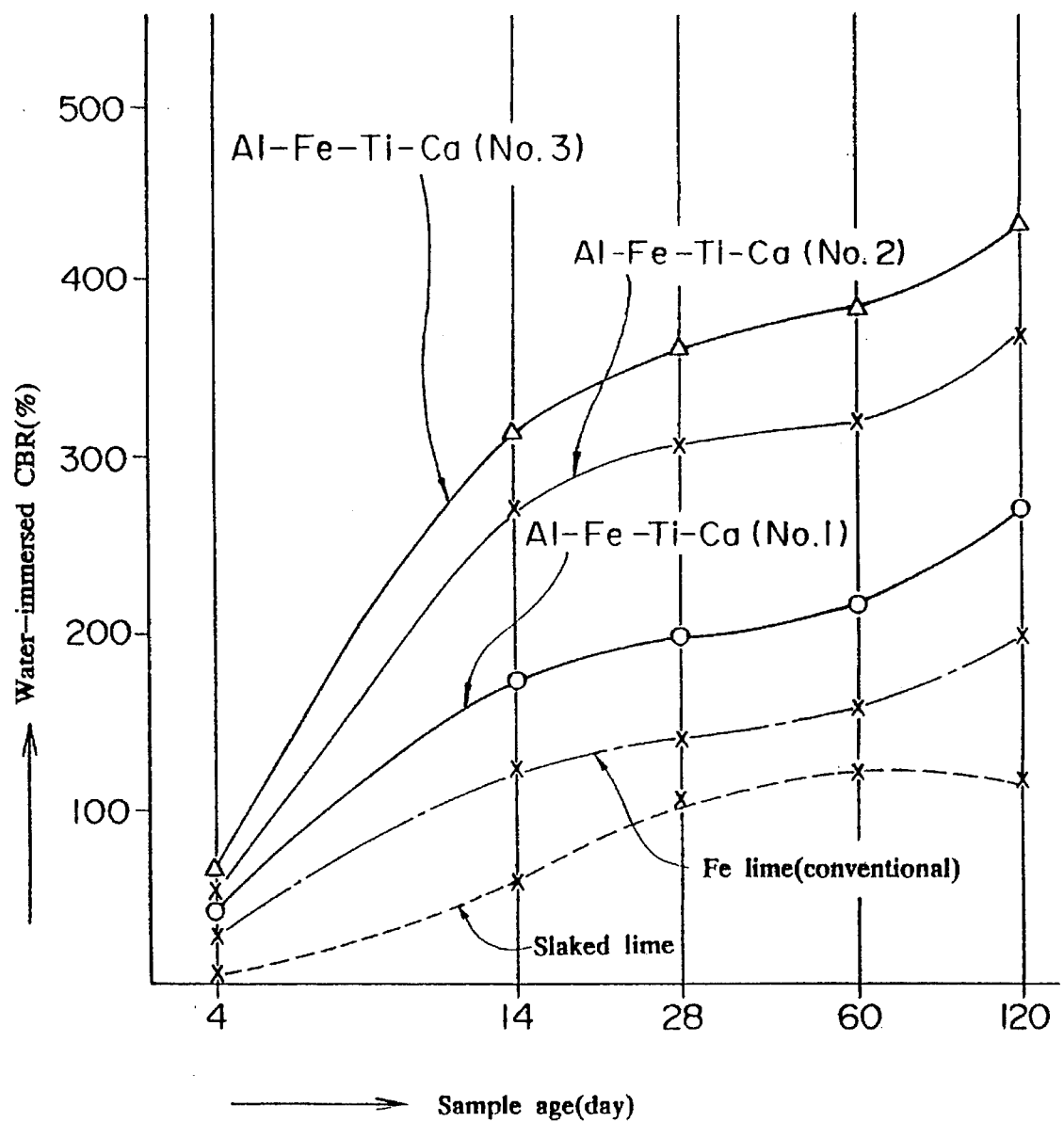

As the test results clearly indicate, with regard to the relation between the sample age and the water immersion CBR(%) and the relation between the sample age and the single axial strength ($kgf/cm^2$) a greater increase in the strength can be seen with the Al—Fe—Ca soil or ground reinforcement treated soil as compared with the conventional Fe lime soil, namely the samples of higher Al contents have greater CBR strength at any sample ages. Further for instance, while the single axial strength of 28 days old samples (que 28) in the former case (the present embodiments) are about 18–27 that are far larger than the approximate 13 in the latter case (the conventional) and the strain at the maximum stress in the present embodiments was above 1.15% that is by no means inferior to the values in the latter case. The single axial strength in the case the sirsu is used as the soil indicates almost identical value to the one in the case of the soil of the decomposed granite in FIG. 9. However, the range of the difference in the strength was fairly large depending on the kind of the soil or ground reinforcing materials. Namely, the effect of Al content in the soil or ground reinforcing material to increase the strength was highest in the case of the sirsu used as the soil. The Al—Fe—Ca No.3 soil or ground reinforcement treated soil having the highest Al content among soil or ground reinforcing materials gave approximately 27 $kgf/cm^2$ of maximum stress and also approximately 1.13% of the maximum strain with 28 days old sample. The single axial compression test result of 28 days old sample of 8% cement gave approximately 17 $kgf/cm^2$ of the maximum stress and approximately 0.65% of the maximum strain. Hence, the application of the Al—Fe—Ca No.3 soil or ground reinforcing soil made it possible to give about 1.6 times greater strength and about 1.8 times higher flexibility as compared with the addition of cement.
2-3) Strength test of silica sand soil The samples were prepared with silica: powder (below 0.074 mm) the chemical composition of which is shown in Table 14 and 3 kinds of natural silica sands (5.0–0.074 mm) were mixed into the soil prepared to have a synthesized particle size (a general sandy soil: relatively weathered decomposed granite) based on a known particle size curve at a mixing rate of 93% of the soil and 7% of the soil or ground reinforcing material shown in Table 3 (dried weight composition) by CBR 1 layer 20 times 5 layers stick-hardening in accordance with JIS A 1211CBR Test Method. The ageing method was under the same conditions as in the case of the strength test of the decomposed granite used as the soil. The water immersion CBR test results are shown in Table 15 and FIG. 14. The consideration of the test results are as follows:
(1) The Al—Fe—Ca soil or ground reinforcement treated soil in the present embodiments shows CBR=45–70% with 4 days old sample and CBR=180–315% with 14 days old sample and the increase in the strength was gentle with up to 60 days old samples but thereafter the increase was sharp and CBR=270–430% was shown with 120 days old sample as compared with slaked lime treated soil and Fe lime soil or ground reinforcement treated soil. The CBR strength was increased in proportion to the $Al_2O_3$ content in the soil or ground reinforcing materials. (2) The period of the sample age from 14 to 60 is the time to form Al—Fe hydrate (1) in the form of gel from Al—Fe oxides mixture hydrated as described in the reaction mechanism of the soil or ground reinforced soil shown in FIG. 1.

After 60 days the crystalline developed again with the presence of oxygen and a structural stability was achieved by forming Aluminum-Oxygen bonding chain showing a strong bonding with silicic acid and Iron-Oxygen bonding chain showing viscoelasticity under a complex crystalline condition.

Since CBR strength is increased in proportion to the $Al_2O_3$ content in the soil or ground reinforcing material, the material having more $Al_2O_3$ content would be preferable, if the soil or ground reinforcing material should be evaluated based on the strength only or the elastic coefficient only. However, as seen from the results of AASHO Test Road another important factor of viscoelasticity or flexibility should be considered. Further the strength and flexibility required are variable depending on the location of the pavement construction where the application should be made. In case the application is made as a reinforcing course of soft subgrade the viscoelasticity should be considered rather than the strength. In case the application is made to the base course right under the asphalt surface course the strength takes priority. Experiment has been made on the relation between the sample age and the single axial strength of the soil or ground reinforcement treated soil using silica sand. As a result, it was learned that the relation indicates an intermediate value between the data obtained from the experiments on the soil or ground reinforcement treated soil using the decomposed granite and the treated soil using the sirsu.

The soil or ground reinforcement treatment method of this invention employs a soil or ground reinforcing material of Aluminum oxide and Iron oxide rich Al—Fe oxides mixture added with lime and as the results of the embodiments indicate, the Al oxide mixture in the soil or ground reinforcing material enhances the strength of the soil or ground reinforcement treated soil and the Fe oxide mixture enhances the viscoelasticity of the soil or ground reinforcement treated soil.

When the soil or ground reinforcement treated soil is used as a pavement construction material, the strength enhancement gives a dispersion effect of load to reduce the deflection by wheel load of the pavement and the viscoelasticity absorbs the shock load by traveling vehicles to prevent the structural destruction of the pavement or the fluid rutting of the asphalt pavement materials and thus greatly extend the service life of the pavement. An efficient application of this invention is to mix the Al—Fe oxides mixture in the Al—Fe—Ca soil or ground reinforcing material within the range of 5–15% by weight of Aluminum oxide and 15–35% by weight of Iron oxide. If the range should exceed the limit, it would be difficult to achieve the purpose of greatly improving the strength with maintaining the flexibility. Further the red mud byproduced in the smeltering of Aluminum contains Titanium oxide ($TiO_2$) in addition to the main compositions of Aluminum oxide ($Al_2O_3$) and Iron oxide ($Fe_2O_3$) and when Al—Fe—Ti—Ca soil or ground reinforcing material containing Titanium oxide is added to soil, the Titanium oxide would give additional effect to the structural reinforcement of the soil or ground with regard to the reaction shown in FIG. 1. In this case the Titanium oxide content in the soil or ground reinforcing material gave excellent effect within the range of 0.5–2.0% by weight.

Table 1 shows the chemical analysis of scoria bed. (An excerpt from "Characteristic Soils in Kyushu and Okinawa" compiled by The Society of Soil Quality Engineering of Japan, Kyushu Branch and published by The University of Kyushu Publishing Committee) The chemical composition of the scoria bed is characterized by the existence of Aluminum oxide ($Al_2O_3$) and Iron oxide ($Fe_2O_3$), and it was learned that this was very similar to the analysis of the red mud. (residue of the production of highly pure alumina by treating bauxite with sodium hydroxide)

Table 2 shows the chemical analysis of Al—Fe—Ti oxides mixture (red mud). (as per the analysis of Japan Steel Corporation TAC Analysis Center)

Figure 1:
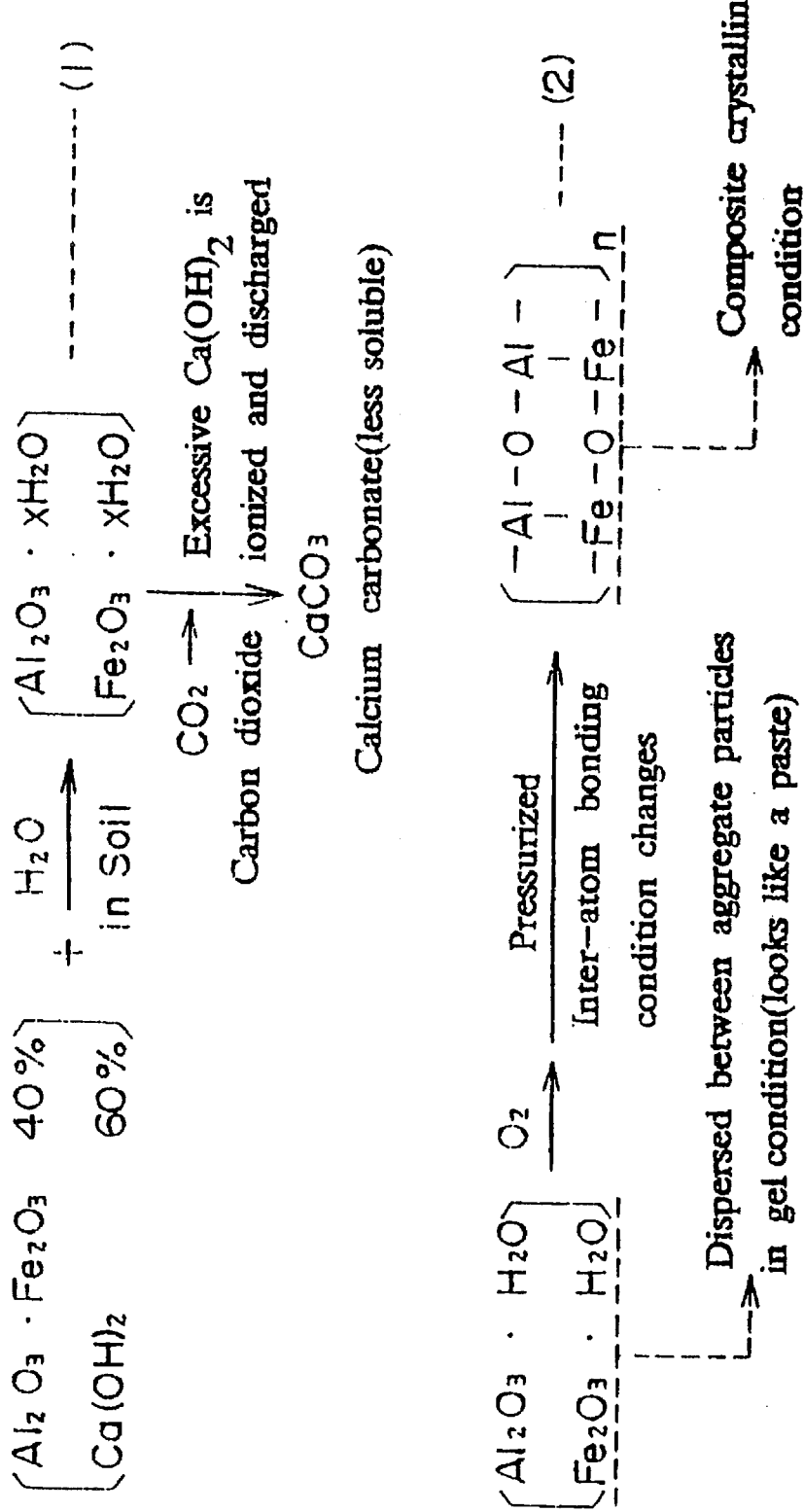

FIG. 1 indicates the reaction mechanism when the soil or ground reinforcing material consisting of the mixture of this Al—Fe oxides mixture and slaked lime is added to soil.

When the mixture of the Al—Fe oxides mixture and slaked lime is added to soil, the slaked lime dissolves in the soil moisture to show a strong alkalinity. Under the alkaline condition the Al—Fe oxides mixture is hydrated to form active Aluminum-Iron hydrate (I) which is dispersed between the aggregate particles in a state of gel. Then the crystals develop by physical actions such as a compression and in the presence of oxygen an irreversible chemical change takes place with time to form Aluminum-Oxygen bonded chain having a strong bonding power of Aluminum with silicic acid and Iron-Oxygen bonded chain having viscoelasticity that is specific with Iron and the combination of these forms a complex crystalline condition (II) to reinforce the structure of the soil or ground.

The electron microscopic consideration of the soil or ground reinforcing material consisting of Al—Fe oxides mixture and slaked lime (hereinafter referred to Al—Fe—Ca soil or ground reinforcing material) added to soil is described as follows:

In case the slaked lime is added to highly crystalline silica powder containing no non-crystalline material by 7% by dried weight, the sample of the powder was stick-hardened and aged for a specified period and dried in a furnace at 110° C. Then cooled down to the ambient temperature and sealed with resin a cut surface photograph of which is shown in FIG. 6 (0 day old) and FIG. 7 (4 days old) respectively.

The Figures indicate that no change took place in the particle structure with the older sample.

Figure 2:
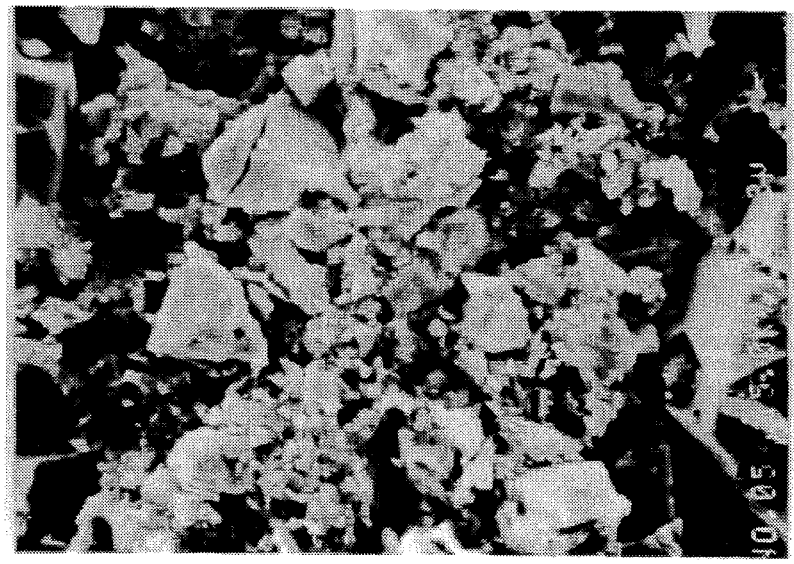
Figure 3:
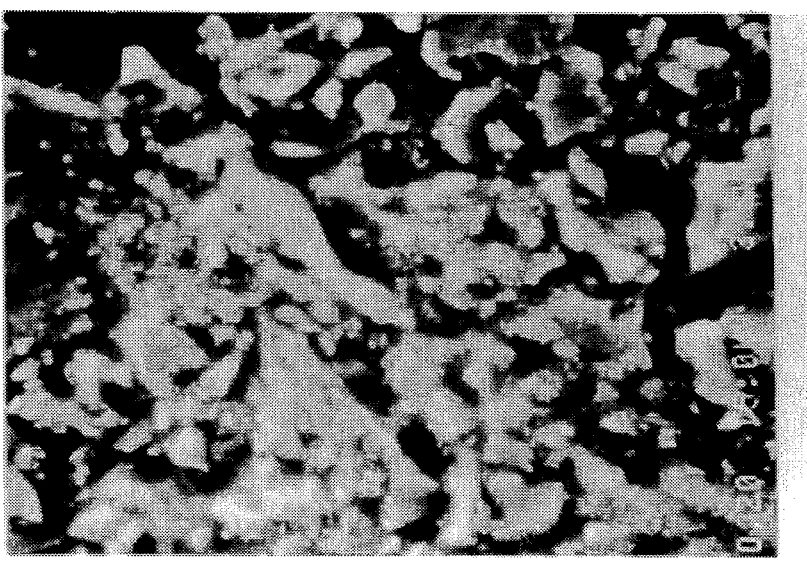
Figure 4:
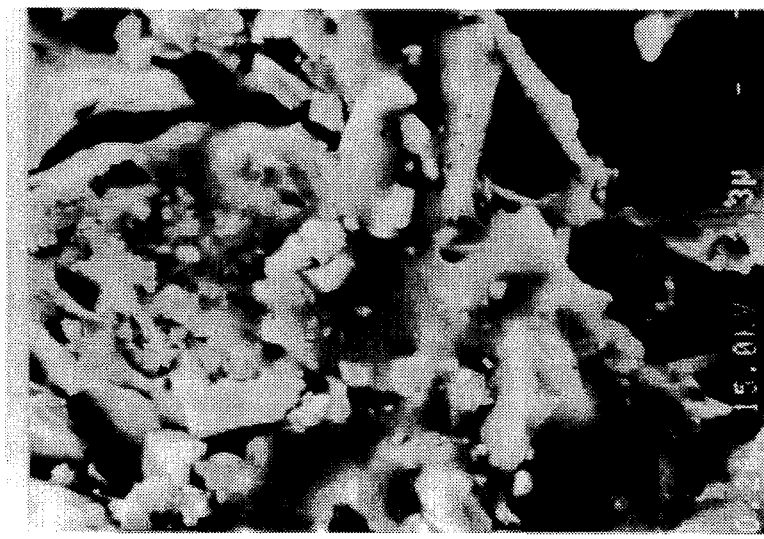
Figure 5:
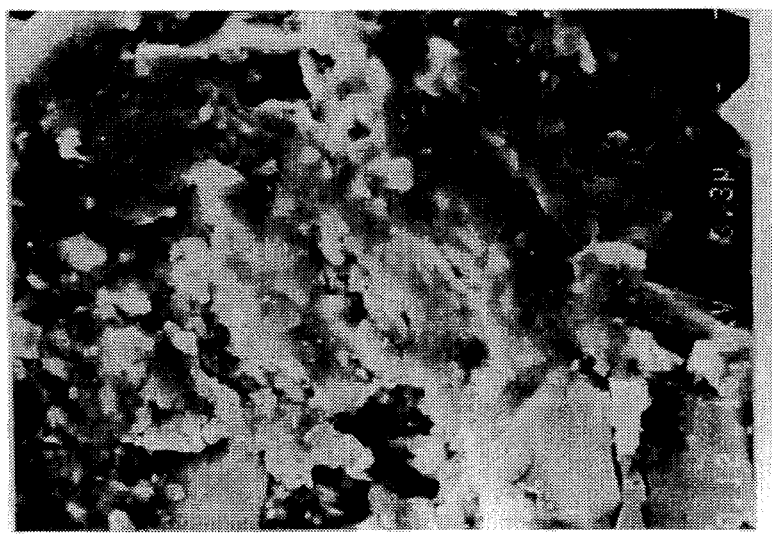
Figure 6:
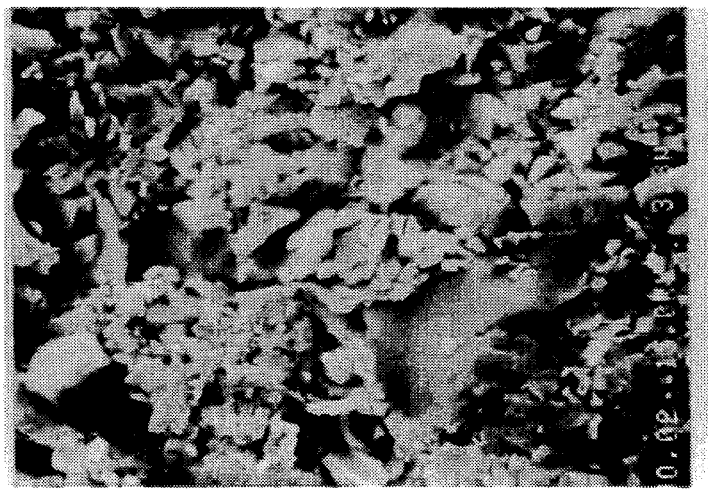
Figure 7:
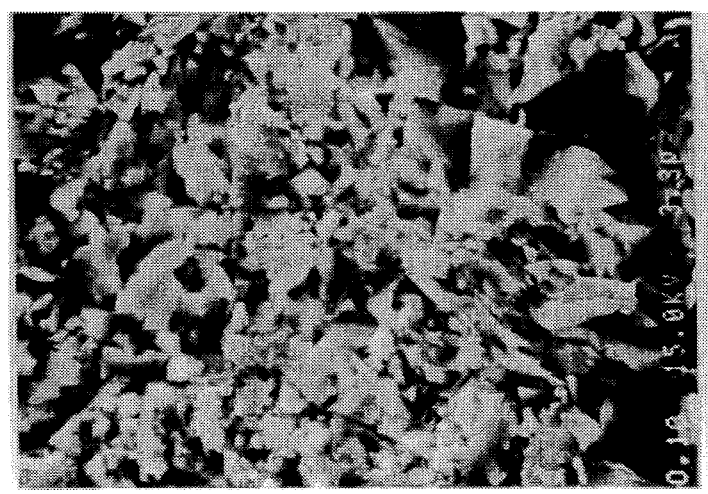
Figure 8:
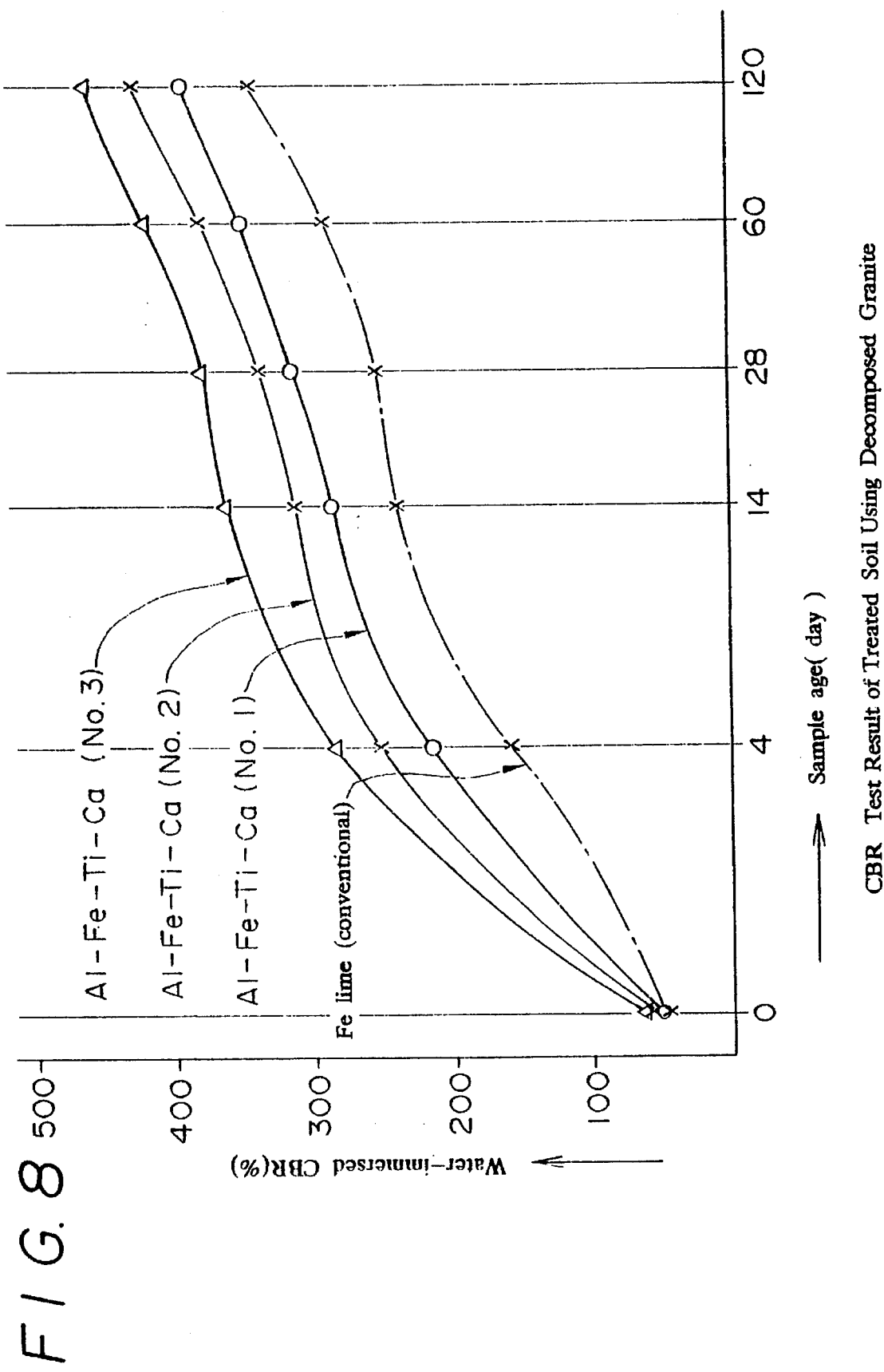

However, in the case Al—Fe—Ca soil or ground reinforcing material (Equivalent to Example Al—Fe—Ca No.2 in Table 3) was added to the above silica powder by 7% by dried weight a comparison made among the cut surface photographs under the same conditions as shown in FIGS. 2 (0 day old), 3 (4 days old), 4 (28 days old) and 5 (60 days old) indicate that FIG. 2 showing the condition immediately after the stick-hardening looks very similar to FIG. 6 of simple substance of silica sand but in FIG. 3 of 4 days old sample non-crystalline phenomenon was observed. FIG. 4 of 28 days old sample shows Al—Fe oxides mixture being hydrated and dispersed in a gel condition and further from FIG. 5 of 60 days old sample a crystalline development of Al—Fe hydrated oxides wrapping the silica in the presence of oxygen was observed.

The strength and the viscoelasticity properties corresponding to this reaction mechanism indicate a deep correlationship with the relation between the stress and strain at the single axial compression test to be discussed later and therefore a pavement can be constructed with a material having moderate mechanical properties between those of the elastic materials represented by the conventional cement-concrete and those of viscoelastic materials represented by asphalt-concrete with regard to the strength for a long period of time.

As described above the soil or ground reinforcement treatment method of this invention is to mix the soil or ground reinforcing material of Al—Fe—Ti oxides mixture the major contents of which are Aluminum oxide, Iron oxide and Titanium oxide added with lime into crushed stones, natural soil, etc. to increase the strength and give a buffer effect by the viscoelasticity through the soil or ground reinforcement treatment.

Therefore, the application of this invention to the pavement construction materials enhances the load dispersion effect to reduce the deflection of the pavement body caused by wheel loads and absorb and relieve the shock load (normally about 1.8 times as much as static wheel loads in pavement design) generated by traveling vehicles. Hence the application of the soil or ground reinforcement treatment of this invention to a reinforcing course on soft subgrade may relieve the shock loads or vibration coming from the pavement body to prevent the fatigue or softening of the existing subgrade. This buffer action can demonstrate an epock-making deterrent effect against the fluid rutting on the roads that has been a fatal problem to the asphalt pavement works in this country.

The preferred embodiments of the soil or ground reinforcement treatment method of this invention are described in the case of the application to the road pavement on soft subgrade but the application of the treatment method of this invention may be practiced in still other ways such as to the ground where a housing is to be built, a parking lot, a playground or an airport.

For reference Tables 1–15 are described below and included herein after

Table 1: Chemical Analysis of Scoria Bed

Table 2: Chemical Analysis of Al—Fe Oxides Mixture (red mud)

Table 3: Main Contents of Soil or Ground Reinforcing Materials

Table 4: Chemical Composition of Quick Lime

Table 5: Chemical Composition of Slaked Lime

Table 6: Physical Properties of Decomposed Granite Soil

Table 7: Chemical Composition of Decomposed Granite Soil

Table 8: CBR Test Results of Soil or Ground Reinforcement Treated Soil Using Decomposed Granite Table 9: Single Axial Compression Test Results of Soil or Ground Reinforcement Treated Soil Using Decomposed Granite Table 10: Specific Gravity and Particle Size Composition of Sirsu Soil Table 11: Chemical Composition of Sirsu Soil Table 12: CBR Test Results of Soil or Ground Reinforcement Treated Soil Using Sirsu Table 13: Single Axial Compression Test Results of Soil or Ground Reinforcement Treated Soil Using Sirsu Table 14: Chemical Composition and Particle Size Distribution of Silica Powder Table 15: CBR Test Results of Soil or Ground Reinforcement Treated Soil Using Silica Sand

TABLE 1

Chemical Analysis of Scoria Bed

| Sample | Loss by ignition | $SiO_2$ | $Fe_2O_3$ | $Al_2O_3$ | $TiO_2$ | MnO | CaO | MgO | $K_2O$ | $Na_2O$ | $P_2O_5$ | Total |
|---|---|---|---|---|---|---|---|---|---|---|---|---|
| Sample 1 | 8.11 | 46.29 | 12.52 | 19.70 | 2.12 | 0.08 | 5.77 | 4.76 | 0.35 | 1.72 | 0.08 | 101.50 |
| Sample 2 | 4.85 | 48.85 | 13.58 | 19.15 | 0.98 | 0.12 | 6.90 | 5.55 | 0.05 | 0.30 | 0.09 | 100.42 |
| Sample 3 | 8.92 | 43.46 | 16.30 | 19.26 | 1.65 | 0.15 | 5.47 | 4.74 | 0.08 | 0.22 | 0.13 | 100.38 |
| Sample 4 | 12.65 | 41.64 | 14.82 | 20.20 | 0.83 | 0.08 | 3.77 | 4.75 | 0.25 | 0.83 | 0.10 | 99.92 |
| Sample 5 | 0.66 | 49.11 | 14.50 | 15.79 | 2.19 | 0.14 | 9.10 | 7.64 | 0.42 | 1.87 | 0.14 | 101.56 |

TABLE 2

Chemical Analysis of Al—Fe Oxides Mixture (red mud)

| Sample | T.Fe | M.Fe | FeO | $Fe_2O_3$ | $SiO_2$ | CaO | MnO | MgO | $Al_2O_3$ | $TiO_2$ | C |
|---|---|---|---|---|---|---|---|---|---|---|---|
| Al—Fe oxides mixture | 31.56 | 0.35 | 0.14 | 44.47 | 16.42 | 0.27 | 0.18 | 0.24 | 21.01 | 2.69 | 0.50 |

TABLE 3

Main Contents of Reinforcing Materials

| | Main contents (%) | | | |
|---|---|---|---|---|
| Materials | $Al_2O_3$ | $Fe_2O_3$ | $TiO_2$ | $Ca(OH)_2$ |
| Examples | | | | |
| Al—Fe—Ti—Ca No. 1 | 5.00 | 36.13 | 0.62 | 48.85 |
| Al—Fe—Ti—Ca No. 2 | 10.51 | 22.24 | 1.42 | 48.85 |
| Al—Fe—Ti—Ca No. 3 | 15.02 | 31.80 | 1.92 | 27.85 |
| Comparison | | | | |
| Fe lime (conventional) | 0.51 | 47.46 | — | 48.85 |
| Slaked lime | Trace | Trace | — | 97.72 |

TABLE 4

Chemical Composition of Quick Lime (%)

| Sample | Ig. loss | $SiO_2$ | $Fe_2O_3.Al_2O_3$ | CaO | MgO | S | P |
|---|---|---|---|---|---|---|---|
| Quick lime (Taihei Industry) | 16.94 | 0.10 | 0.19 | 81.47 | 0.80 | 0.004 | 0.008 |

Ig. loss means loss of $CO_2$, $H_2O$, etc. which were ignited.

TABLE 5

Chemical Composition of Slaked Lime (%)

| Sample | $Ca(OH)_2$ | CaO | $CO_2$ | $SiO_2$ | $Al_2O_3$ | $Fe_2O_3$ | MgO |
|---|---|---|---|---|---|---|---|
| Slaked lime (Ito Industry) | 97.72 | 73.95 | 1.28 | | 1.22 | | |

TABLE 6

Physical Properties of Decomposed Granite Soil

| | Particle size (%) | | | | Consistency | | | Hardening properties | | Natural moisture (%) |
|---|---|---|---|---|---|---|---|---|---|---|
| Soil particle s.g. | Gravel | Sand | Silt | Clay | LL % | PL % | PI | Optimal moisture | Max. dried density | |
| 2.724 | 10.5 | 64.2 | 20.0 | 5.3 | 39.0 | 23.5 | 15.5 | 13.1% | 1.883 g/cm³ | 13.3 |

TABLE 7

Chemical Composition of Decomposed Granite Soil (%)

| | T.Fe | $SiO_2$ | CaO | MnO | MgO | $P_2O_5$ | $Cr_2O_3$ | $TiO_2$ | $Al_2O_3$ | $Na_2O$ | $K_2O$ | pH |
|---|---|---|---|---|---|---|---|---|---|---|---|---|
| Sample | 4.19 | 63.9 | 0.76 | 0.15 | 2.25 | 0.18 | 0.01 | 0.84 | 19.1 | 2.62 | 1.94 | 7.1 (1 g/100 ml soluble) |

Tested by Japan Steel Corporation Yawata Steel Mill TAC Center

TABLE 8

CBR Test Result of Treated Soil Using Decomposed Granite
(Unit): Stick-hardened moisture = %
Dried density = g/cm³
CBR = %

| | | Sample age (day) | | | | | |
|---|---|---|---|---|---|---|---|
| | | 0 Non-immersed | 4 Immersed | 14 Immersed | 28 Immersed | 60 Immersed | 120 Immersed |
| Examples | | | | | | | |
| Al—Fe—Ti—Ca (No. 1) | Stick-hardened moisture | 12.9 | 12.8 | 12.8 | 12.6 | 13.2 | 13.3 |
| | Dried density | 1.709 | 1.686 | 1.673 | 1.687 | 1.676 | 1.667 |
| | CBR | 55.0 | 216.4 | 287.3 | 315.0 | 350.1 | 393.2 |
| Al—Fe—Ti—Ca (No. 2) | Stick-hardened moisture | 12.8 | 12.9 | 12.8 | 13.1 | 13.2 | 13.2 |
| | Dried density | 1.710 | 1.685 | 1.673 | 1.680 | 1.676 | 1.669 |
| | CBR | 60.4 | 254.5 | 314.8 | 341.0 | 380.2 | 423.5 |

TABLE 8-continued

CBR Test Result of Treated Soil Using Decomposed Granite
(Unit): Stick-hardened moisture = %
Dried density = g/cm³
CBR = %

| | | Sample age (day) | | | | | |
|---|---|---|---|---|---|---|---|
| | | 0 Non-immersed | 4 Immersed | 14 Immersed | 28 Immersed | 60 Immersed | 120 Immersed |
| Al—Fe—Ti—Ca (No. 3) | Stick-hardened moisture | 12.9 | 12.9 | 12.8 | 13.2 | 13.1 | 13.3 |
| | Dried density | 1.655 | 1.665 | 1.668 | 1.674 | 1.661 | 1.661 |
| | CBR | 60.7 | 280.2 | 360.8 | 380.0 | 429.4 | 461.8 |
| Comparison | | | | | | | |
| Fe lime | Stick-hardened moisture | 13.7 | 13.1 | 13.1 | 12.9 | 12.8 | 13.2 |
| | Dried density | 1.690 | 1.704 | 1.698 | 1.713 | 1.705 | 1.693 |
| | CBR | 50.5 | 156.3 | 242.0 | 255.6 | 289.2 | 349.0 |

TABLE 9

Single Axial Compression Test Result of Treated Soil Using Decomposed Granite
(Unit): Stick-hardened moisture = %, Dried density = g/cm³
Max. Stress = kgf/cm², Max. Strain = %

| | | Sample age (day) | | | | | |
|---|---|---|---|---|---|---|---|
| | | 4 | 7 | 14 | 28 | 60 | 120 |
| Examples | | | | | | | |
| Al—Fe—Ti—Ca (No. 1) | Stick-hardened moisture | 13.3 | 13.2 | 13.5 | 13.4 | 13.6 | 13.7 |
| | Dried density | 1.624 | 1.628 | 1.618 | 1.624 | 1.621 | 1.617 |
| | Max. stress | 9.6 | 12.1 | 15.3 | 16.2 | 21.8 | 26.4 |
| | Max. strain | 1.09 | 1.09 | 1.07 | 1.02 | 0.97 | 0.89 |
| Al—Fe—Ti—Ca (No. 2) | Stick-hardened moisture | 13.5 | 13.4 | 13.4 | 13.2 | 13.1 | 13.6 |
| | Dried density | 1.616 | 1.610 | 1.595 | 1.594 | 1.601 | 1.602 |
| | Max. stress | 10.5 | 13.7 | 16.3 | 17.4 | 23.2 | 26.8 |
| | Max. strain | 1.07 | 1.07 | 1.05 | 0.99 | 0.92 | 0.84 |
| Al—Fe—Ti—Ca (No. 3) | Stick-hardened moisture | 13.4 | 13.5 | 13.2 | 13.6 | 13.6 | 13.4 |
| | Dried density | 1.605 | 1.595 | 1.595 | 1.590 | 1.598 | 1.596 |
| | Max. stress | 11.8 | 15.0 | 18.2 | 19.4 | 17.2 | 29.0 |
| | Max. strain | 1.04 | 1.04 | 1.02 | 0.97 | 0.90 | 0.83 |
| Comparison | | | | | | | |
| Fe lime | Stick-hardened moisture | 13.1 | 13.4 | 13.5 | 13.4 | 13.2 | 13.3 |
| | Dried density | 1.629 | 1.627 | 1.622 | 1.627 | 1.630 | 1.631 |
| | Max. stress | 7.1 | 9.2 | 10.4 | 13.2 | 19.0 | 23.8 |
| | Max, strain | 1.11 | 1.11 | 1.10 | 1.08 | 1.03 | 0.97 |

TABLE 10

Specific Gravity and Particle Size Composition of Soil Used (Sirsu)

| | Particle size composition (%) | | | | | Hardened properties | | Natural moisture (%) |
|---|---|---|---|---|---|---|---|---|
| Soil Particle S.G. | Gravel | Sand | Silt | Clay | Consistency | Optimal moisture | Max. dried weight | |
| 2.462 | 19.6 | 56.8 | 2.5 | 2.5 | NP | 21.3% | 1.300 g/cm³ | 19.63 |

TABLE 11

| | Chemical Composition of Soil Used (Sirsu) (%) | | | | | | | | | | |
|---|---|---|---|---|---|---|---|---|---|---|---|
| | T.Fe | $SiO_2$ | CaO | MnO | MgO | $P_2O_5$ | $Cr_2O_3$ | $TiO_2$ | $Al_2O_3$ | $Na_2O$ | $K_2O$ | pH |
| Sand (Sirsu) | 2.65 | 75.0 | 3.20 | 0.10 | 0.97 | 0.08 | 0.05 | 0.44 | 16.4 | 3.38 | 2.26 | 7.3 |

Tested by Japan Steel Corporation Yawata Steel Mill TAC Center

TABLE 12

CBR Test Result of Treated Soil Using Sirsu
(Unit): Stick-hardened moisture = %
Dried density = g/cm$^3$, CBR = %

| | | Sample age (day) | | | | | |
|---|---|---|---|---|---|---|---|
| | | 0 Non-immersed | 4 Immersed | 14 Immersed | 28 Immersed | 60 Immersed | 120 Immersed |
| Examples | | | | | | | |
| Al—Fe—Ti—Ca (No. 1) | Stick-hardened moisture | 22.4 | 22.2 | 22.3 | 23.1 | 22.0 | 22.2 |
| | Dried density | 1.331 | 1.326 | 1.318 | 1.322 | 1.317 | 1.324 |
| | CBR | 53.0 | 156.0 | 222.0 | 292.0 | 370.5 | 417.0 |
| Al—Fe—Ti—Ca (No. 2) | Stick-hardened moisture | 22.3 | 22.7 | 23.1 | 22.5 | 22.8 | 22.4 |
| | Dried density | 1.295 | 1.296 | 1.300 | 1.301 | 1.301 | 1.316 |
| | CBR | 59.0 | 190.7 | 253.2 | 338.4 | 406.0 | 460.2 |
| Al—Fe—Ti—Ca (No. 3) | Stick-hardened moisture | 22.5 | 22.3 | 22.8 | 22.3 | 22.2 | 22.6 |
| | Dried density | 1.260 | 1.267 | 1.282 | 1.280 | 1.285 | 1.308 |
| | CBR | 61.5 | 215.4 | 282.4 | 362.8 | 431.7 | 481.3 |
| Comparison | | | | | | | |
| Fe lime | Stick-hardened moisture | 22.1 | 21.9 | 22.6 | 21.2 | 22.3 | 22.4 |
| | Dried density | 1.335 | 1.338 | 1.332 | 1.338 | 1.344 | 1.336 |
| | CBR | 34.0 | 113.0 | 174.5 | 235.0 | 318.5 | 344.0 |

TABLE 13

Single Axial Compression Test Result of Treated Soil Using Sirsu
(Unit): Stick-hardened moisture = %, Dried density = g/cm$^3$
Max. stress = kgf/cm$^2$, Max. strain = %

| | | Sample age (day) | | | | | |
|---|---|---|---|---|---|---|---|
| | | 4 | 7 | 14 | 28 | 60 | 120 |
| Examples | | | | | | | |
| Al—Fe—Ti—Ca (No. 1) | Stick-hardened moisture | 20.9 | 20.8 | 21.5 | 21.8 | 20.7 | 21.5 |
| — | Dried density | 1.343 | 1.334 | 1.339 | 1.345 | 1.349 | 1.334 |
| | Max. stress | 9.3 | 11.4 | 14.4 | 18.3 | 21.8 | 23.6 |
| | Max. strain | 1.27 | 1.26 | 1.24 | 1.19 | 1.14 | 1.09 |
| Al—Fe—Ti—Ca (No. 2) | Stick-hardened moisture | 20.9 | 20.8 | 21.5 | 21.9 | 20.9 | 21.5 |
| | Dried density | 1.320 | 1.313 | 1.317 | 1.311 | 1.324 | 1.323 |
| | Max. stress | 12.2 | 14.2 | 17.6 | 22.2 | 25.0 | 26.3 |
| | Max. strain | 1.23 | 1.23 | 1.21 | 1.16 | 1.10 | 1.03 |
| Al—Fe—Ti—Ca (No. 3) | Stick-hardened moisture | 20.9 | 20.8 | 21.8 | 21.7 | 21.1 | 21.6 |
| | Dried density | 1.332 | 1.322 | 1.332 | 1.324 | 1.325 | 1.326 |
| | Max. stress | 15.5 | 17.7 | 21.5 | 27.0 | 28.7 | 30.0 |
| | Max. strain | 1.19 | 1.20 | 1.18 | 1.13 | 1.06 | 0.97 |
| Comparison | | | | | | | |

TABLE 13-continued

Single Axial Compression Test Result of Treated Soil Using Sirsu
(Unit): Stick-hardened moisture = %, Dried density = g/cm³
Max. stress = kgf/cm², Max. strain = %

| | | Sample age (day) | | | | | |
|---|---|---|---|---|---|---|---|
| | | 4 | 7 | 14 | 28 | 60 | 120 |
| Fe lime | Stick-hardened moisture | 21.1 | 19.9 | 21.7 | 21.8 | 20.7 | 21.1 |
| | Dried density | 1.352 | 1.352 | 1.348 | 1.344 | 1.351 | 1.351 |
| | Max. stress | 6.0 | 8.1 | 10.2 | 12.8 | 16.4 | 18.1 |
| | Max. strain | 1.30 | 1.32 | 1.30 | 1.25 | 1.19 | 1.14 |

TABLE 14

Chemical Composition and Particle Size Distribution of Silica Powder

| | Chemical composition % | | | | | Particle size distribution (mesh) % | | | | | |
|---|---|---|---|---|---|---|---|---|---|---|---|
| | $SiO_2$ | $Al_2O_3$ | $Fe_2O_3$ | $TiO_2$ | CaO | 100 | 150 | 200 | 270 | Others | Total |
| Silica powder A-3 | 97.25 | 1.85 | 0.04 | 0.05 | 0.04 | 0.2 | 4.0 | 13.6 | 28.8 | 55.4 | 100 |

TABLE 15

CBR Test Result of Treated Soil Using Silica Sand
(Unit): Stick-hardened moisture = %
CBR = %, Dried density = g/cm³

| | | Sample age (day) | | | | | |
|---|---|---|---|---|---|---|---|
| | | 0 Non-immersed | 4 Immersed | 14 Immersed | 28 Immersed | 60 Immersed | 120 Immersed |
| Examples | | | | | | | |
| Al—Fe—Ti—Ca (No. 1) | Stick-hardened moisture | | 10.1 | 10.0 | 10.1 | 10.3 | 10.4 |
| | Dried density | | 1.894 | 1.888 | 1.886 | 1.888 | 1.884 |
| | CBR | | 45.0 | 179.5 | 199.5 | 215.0 | 270.0 |
| Al—Fe—Ti—Ca (No. 2) | Stick-hardened moisture | | 10.5 | 11.1 | 11.0 | 10.4 | 10.6 |
| | Dried density | | 1.878 | 1.865 | 1.878 | 1.866 | 1.869 |
| | CBR | | 55.0 | 272.5 | 308.0 | 320.0 | 368.0 |
| Al—Fe—Ti—Ca (No. 3) | Stick-hardened moisture | | 10.2 | 10.6 | 10.4 | 10.7 | 9.8 |
| | Dried density | | 1.862 | 1.842 | 1.870 | 1.844 | 1.854 |
| | CBR | | 66.5 | 315.0 | 360.5 | 382.0 | 432.5 |
| Slaked lime | Stick-hardened moisture | | 10.8 | 10.8 | 10.6 | 10.2 | 9.8 |
| | Dried density | | 1.828 | 1.823 | 1.843 | 1.817 | 1.839 |
| | CBR | | 9.0 | 59.8 | 105.0 | 122.6 | 116.0 |
| Comparison | | | | | | | |
| Fe lime | Stick-hardened moisture | | 10.7 | 10.0 | 9.8 | 9.7 | 9.8 |
| | Dried density | | 1.919 | 1.928 | 1.924 | 1.928 | 1.928 |
| | CBR | | 25.5 | 124.0 | 142.5 | 155.0 | 198.5 |

We claim:

1. A soil or ground reinforcement treatment method characterized in forming a soil or ground reinforcing material comprising an Al—Fe—Ti oxides mixture, the main contents of which are aluminum oxide, a relatively highly pure fine iron oxide of approximately 95% by weight to prevent a decrease in strength of a soil or ground to which the soil or ground reinforcing material is added due to an increase in crystalline material content thereof and titanium oxide, and a lime of a calcium hydroxide and adding the soil or ground reinforcing material into the soil or ground containing crushed stones, natural soil, etc.

2. The soil or ground reinforcement treatment according to claim 1, wherein the forming of the soil or ground reinforcing material is conducted at each mixing rate by weight of Al—Fe—Ti oxides mixture in the soil or ground reinforcing material within the ranges of approximately 5–15% of aluminum oxide, approximately 15–35% of iron oxide and approximately 0.5–2.0% of titanium oxide.

3. The soil or ground reinforcement treatment method according to claim 1, wherein the iron oxide is the relatively highly pure fine iron oxide is a by-product of steel production to prevent a decrease in strength of a soil or ground to which the soil or ground reinforcing material is added due to an increase in crystalline material content thereof.

4. The soil or ground reinforcement treatment method according to claim 1, wherein the calcium hydroxide is a relatively highly pure calcium hydroxide of approximately 98% by weight to prevent a decrease in strength of a soil or ground to which the soil or ground reinforcing material is added due to an increase in crystalline material content thereof.

5. The soil or ground reinforcing treatment method according to claim 1, wherein the adding and mixing rate of the soil or ground reinforcing material into the soil or ground is approximately 7%.

* * * * *